US008165772B2

(12) United States Patent
Thor

(10) Patent No.: US 8,165,772 B2
(45) Date of Patent: Apr. 24, 2012

(54) TRANSMISSION SLIP CONTROL

(75) Inventor: Todd J. Thor, Byron, MI (US)

(73) Assignee: GM Global Technology Operations LLC

( * ) Notice: Subject to any disclaimer, the term of this patent is extended or adjusted under 35 U.S.C. 154(b) by 1328 days.

(21) Appl. No.: 11/739,904

(22) Filed: Apr. 25, 2007

(65) Prior Publication Data

US 2008/0009995 A1      Jan. 10, 2008

Related U.S. Application Data

(60) Provisional application No. 60/819,005, filed on Jul. 6, 2006.

(51) Int. Cl.
*G06F 7/00* (2006.01)
(52) U.S. Cl. ........... 701/87; 701/51; 701/67; 701/69; 701/90; 474/11; 474/12; 474/18; 474/44; 474/45; 477/176; 477/186; 477/45
(58) Field of Classification Search ............ 701/51, 701/61, 87, 95; 477/15, 34, 77, 79, 107, 477/169, 180; 474/11, 12, 18, 44, 45
See application file for complete search history.

(56) References Cited

U.S. PATENT DOCUMENTS

| 4,796,718 | A | * | 1/1989 | Thielen et al. ............... 180/197 |
| 4,805,750 | A | * | 2/1989 | Nitz ........................... 192/3.58 |
| 5,697,479 | A | * | 12/1997 | Kono et al. .................. 192/3.31 |
| 6,299,565 | B1 | | 10/2001 | Jain et al. |
| 6,468,182 | B1 | * | 10/2002 | Brandt et al. ................... 477/98 |
| 2004/0073350 | A1 | | 4/2004 | Nagata et al. |
| 2004/0204279 | A1 | * | 10/2004 | Oshima et al. .................. 475/43 |
| 2004/0229728 | A1 | * | 11/2004 | Oshima et al. ................ 477/176 |
| 2004/0242370 | A1 | * | 12/2004 | Iwatsuki et al. ................ 477/45 |
| 2005/0250618 | A1 | | 11/2005 | Colvin |
| 2007/0155584 | A1 | * | 7/2007 | Tabata et al. ................... 477/70 |

FOREIGN PATENT DOCUMENTS

| DE | 10033647 A1 | 1/2002 |
| DE | 10346922 A1 | 4/2004 |

OTHER PUBLICATIONS

German Office Action for serial No. 102007030771.5 dated Jun. 14, 2011; 6 pages.

* cited by examiner

*Primary Examiner* — Redhwan K Mawari

(57) ABSTRACT

A method of managing slip in a transmission that is driven by a prime mover includes determining whether a slip condition of the transmission is present based on a slip value and reducing a torque output of the prime mover based on a torque reduction value when the slip condition is present. The method further includes storing the torque reduction value in an array if the slip condition is resolved as a result of the step of reducing and identifying a faulty component within the transmission based on the array.

22 Claims, 3 Drawing Sheets

TRANSMISSION SLIP CONTROL

CROSS-REFERENCE TO RELATED APPLICATIONS

This application claims the benefit of U.S. Provisional Application No. 60/819,005, filed on Jul. 6, 2006. The disclosure of the above application is incorporated herein by reference.

FIELD

The present disclosure relates to a transmission that is driven by a prime mover, and more particularly to a transmission slip control for detecting and managing transmission slip.

BACKGROUND

The statements in this section merely provide background information related to the present disclosure and may not constitute prior art.

Traditionally, vehicles include a prime mover, such as an internal combustion engine, that generates drive torque. The drive torque is transferred through a powertrain to drive a drivetrain, propelling the vehicle along a surface. Exemplary powertrain components include a transmission and a coupling device, through which the drive torque from the engine is transferred to the transmission. The transmission multiplies the drive torque by a gear ratio and further transfers the multiplied drive torque to the driveline.

An exemplary transmission includes an automatic transmission having a plurality of transmission elements that are hydraulically engaged to establish a desired gear ratio. Accordingly, each transmission element includes a corresponding hydraulic circuit having a variable bleed solenoid (VBS) to regulate the actuation pressure of a corresponding transmission element.

A transmission slip condition can occur when a transmission element is defective and/or worn or the corresponding hydraulic circuit is providing insufficient pressure to fully engage the particular transmission element. The transmission slip condition can damage transmission components and detrimentally affects the vehicle drivability.

Accordingly, traditional transmission slip control routines determine whether a slip condition is present and commands a transmission shift if the slip condition remains for a predetermined time period. By executing a shift and monitoring whether a slip condition exists in the next gear ratio, the traditional transmission slip control can identify which transmission element and/or hydraulic circuit is the source of the slip condition. However, if the vehicle operator changes the vehicle operating conditions (e.g., steps into the accelerator pedal changing the engine torque request), another transmission shift may be executed. As a result, the traditional slip control can inaccurately identify a particular transmission element and/or hydraulic circuit as being defective, which results in increased warranty costs and customer dissatisfaction.

SUMMARY

Accordingly, the present invention provides a method of managing slip in a transmission that is driven by a prime mover. The method includes determining whether a slip condition of the transmission is present based on a slip value and reducing a torque output of the prime mover based on a torque reduction value when the slip condition is present. The method further includes storing the torque reduction value in an array if the slip condition is resolved as a result of the step of reducing and identifying a faulty component within the transmission based on the array.

In other features, the method further includes incrementing the torque reduction value if the slip condition is not resolved. A shift of the transmission is initiated if the torque reduction value exceeds a maximum torque reduction value.

In another feature, the method further includes initiating a self-correction routine if the slip condition is present.

In another feature, the slip value is determined based on a transmission input shaft speed and a transmission output shaft speed.

In another feature, the torque reduction value is determined based on the slip value.

In still another feature, the method further includes setting a diagnostic trouble code based on the array.

In yet another feature, the array includes a plurality of torque reduction values that are associated with a corresponding plurality of clutches of the transmission.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
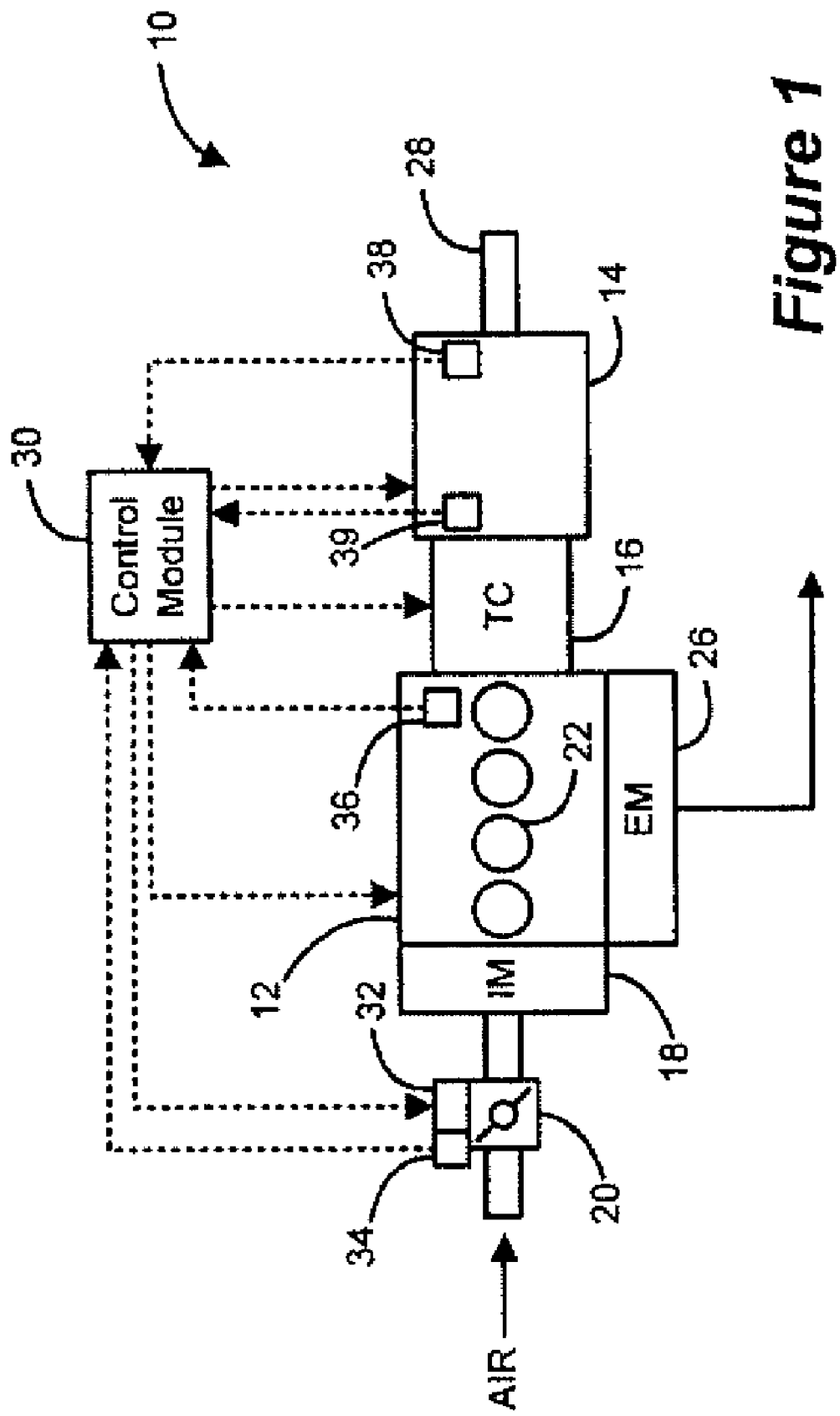
FIG. 1 is a functional block diagram of an exemplary vehicle powertrain that is regulated based on the transmission slip control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary powertrain 10 is illustrated and includes an engine 12 that drives a transmission 14 through a coupling device 16. More specifically, air is drawn into an intake manifold 18 of the engine 12 through a throttle 20. The air is mixed with fuel and the air/fuel mixture is combusted within cylinders 22 to reciprocally drive pistons (not shown) within the cylinders 22. The pistons rotatably drive a crankshaft (not shown) to provide drive torque. Exhaust generated by the combustion process is exhausted from the engine through an exhaust manifold 26. Although 4 cylinders are illustrated, it is appreciated that the present invention can be implemented in vehicles having any number of cylinders.

The drive torque drives is transferred through the coupling device 16 to drive the transmission 14. The transmission 14 multiplies the drive torque by a desired gear ratio to provide a modified drive torque. The modified drive torque is transferred to a vehicle driveline (not shown) by a transmission output shaft 28. The transmission 14 includes an automatic transmission that provides a plurality of pre-defined, fixed gear ratios, wherein shifting of the transmission 14 is automatically regulated based on a selected drive range (e.g., P, R, N, D, L), a vehicle speed ($V_{VEH}$) and an engine load.

A control module 30 regulates operation of the powertrain based on vehicle operating parameters. More specifically, the control module 30 regulates an effective throttle area ($A_{EFF}$) via a throttle actuator 32. A throttle position sensor 34 generates a throttle position signal (TPS) based on the angular position of the throttle 20. The control module 30 determines a requested engine torque ($T_{ENG}$) and adjusts the throttle position and other engine operating parameters to achieve $T_{ENG}$. The other engine operating parameters include, but are not limited to, a fueling rate, spark timing, a camshaft phase and/or an intake/exhaust valve lift or timing.

The control module 30 also regulates operation of the transmission 14 based on vehicle operating parameters. More specifically, a crankshaft position sensor 36 generates a crankshaft position signal, which is used to determine an actual engine speed ($RPM_{ENG}$). A transmission output shaft speed (TOSS) sensor 38 generates a TOSS signal, which is used to determine $V_{VEH}$, and a transmission input shaft speed (TISS) sensor 39 generates a TISS signal.

For the purpose of the present description, an exemplary 6-speed automatic transmission will be briefly described. It is anticipated, however, that the transmission slip control of the present invention can be implemented with any type of transmission know in the art. The exemplary 6-speed automatic transmission includes four clutches C1-C4 and a brake element B1, each of which is hydraulically actuated via a corresponding hydraulic circuit. C1-C4 and B1 are selectively implemented in pairs to establish 6 forward gear ratios and a reverse ratio, in accordance with Table 1, below:

TABLE 1

|    | $1^{st}$ | $2^{nd}$ | $3^{rd}$ | $4^{th}$ | $5^{th}$ | $6^{th}$ | R |
|----|---|---|---|---|---|---|---|
| C1 | X | X | X | X |   |   |   |
| C2 |   | X |   |   |   | X |   |
| C3 |   |   | X |   | X |   | X |
| C4 |   |   |   | X | X | X |   |
| B1 | X |   |   |   |   |   | X |

Accordingly, two transmission elements (i.e., C1-C4 and B1) are actuated to establish a desired gear ratio.

During a gear shift, one of the two transmission elements remains actuated while the other transmission element gradually disengages (i.e., is off-going) and a third transmission element gradually engages (i.e., is on-coming). For example, in $1^{st}$ gear, C1 and B1 are engaged. During an upshift to $2^{nd}$ gear, C1 remains engaged. B1 gradually disengages while C2 gradually engages. Similarly, C1 remains engaged, C2 gradually disengages and C3 gradually engages during an upshift to $3^{rd}$ gear.

The transmission slip control of the present invention determines whether a transmission slip condition is present based on the TISS and TOSS signals. More specifically, the transmission slip control monitors the rotational speed of the transmission input shaft ($RPM_{IS}$) and that of the transmission output shaft ($RPM_{OS}$), and determines a theoretical input shaft speed ($RPM_{ISTHR}$) by multiplying $RPM_{OS}$ by the current gear ratio. If $RPM_{ISTHR}$ is less than $RPM_{IS}$, a slip condition is present. A slip condition indicates that at least one of the transmission elements for the particular gear ratio is not fully engages and slip is occurring across the transmission element (s). The slip condition can result from a defective or worn transmission element or a low pressure condition of the corresponding hydraulic circuit(s) (e.g., a fluid blockage), that inhibits the transmission element(s) from fully engaging.

In the event that the slip condition is present, the transmission slip control reduces $T_{ENG}$ by a torque reduction value ($T_{RED}$). It is also anticipated, however, that a self-correction routine can be executed in an attempt to clear the associated hydraulic circuits (i.e., corresponding to each of the two engaged transmission elements) prior to reducing $T_{ENG}$. In general, the self-correction routine flushes the associated hydraulic circuits with little or no detriment to the vehicle drivability. That is to say that the hydraulic circuits can be flushed without the vehicle operator noticing any fluctuation in driving performance. If the source of the slip condition is a blockage in the hydraulic circuit, the self-correction routine could resolve the slip condition without requiring further action.

In the event that the slip condition is not resolved, the transmission slip control reduces $T_{ENG}$ based on $T_{RED}$. $T_{RED}$ can be a predetermined, fixed value or can be determined based on the slip value (i.e., the difference between $RPM_{IS}$ and $RPM_{ISTHR}$). If the slip condition is not resolved via the initial $T_{ENG}$ reduction, $T_{RED}$ can be incremented or otherwise increased in an effort to further reduce $T_{ENG}$ to resolve the slip condition. However, if the continuous $T_{ENG}$ reduction still fails to resolve the slip condition and $T_{RED}$ has achieved a maximum torque reduction value ($T_{REDMAX}$) (e.g., 10-15% of the original $T_{ENG}$), a transmission shift is initiated. The transmission shift preferably includes an upshift, but it is anticipated that a downshift can be executed (e.g., if the transmission is in $6^{th}$ gear, for example). If the slip condition is resolved without $T_{RED}$ achieving $T_{REDMAX}$, the transmission continues to operate in the same gear ratio with the reduced $T_{ENG}$, until a transmission shift is commanded using the normal shift logic (i.e., based on $V_{VEH}$ and other operating parameters).

$T_{RED}$ values associated with each gear ratio are stored in an array. An exemplary array is provided as provided in Table 2 below:

TABLE 2

|           | $1^{st}$    | $2^{nd}$    | $3^{rd}$    | $4^{th}$    | $5^{th}$    | $6^{th}$    | R          |
|-----------|-------------|-------------|-------------|-------------|-------------|-------------|------------|
| $T_{RED}$ | $T_{RED1}$  | $T_{RED2}$  | $T_{RED3}$  | $T_{RED4}$  | $T_{RED5}$  | $T_{RED6}$  | $T_{REDR}$ |

A faulty transmission element and/or hydraulic circuit can be identified based on the array values. More specifically, and as discussed in detail above, two transmission elements are engaged for any particular gear ratio. Accordingly, if the $T_{RED}$ value is greater than zero for two different gear ratios in which the same transmission element is engaged, that particular transmission element and/or the hydraulic circuit associated therewith is defective. For example, if $T_{RED1}$, and $T_{RED3}$ are both greater than zero, C1 and/or its associated hydraulic circuit are most likely defective, because C1 is the only transmission element that is engaged in both $1^{st}$ and $3^{rd}$ gears.

The transmission slip control sets a diagnostic trouble code (DTC) corresponding to a particular transmission element or elements deemed to be defective. It is anticipated, however, that the DTC may only be set if the slip condition is particularly sever. For example, if the slip value is marginal for a particular gear ratio, the transmission slip control may wait for the slip condition to become more sever before setting the DTC. A technician can readily identify the defective component by reading the DTCs. In this manner, the transmission can be easily and effectively repaired, decreasing warranty and other associated costs.

Figure 2:
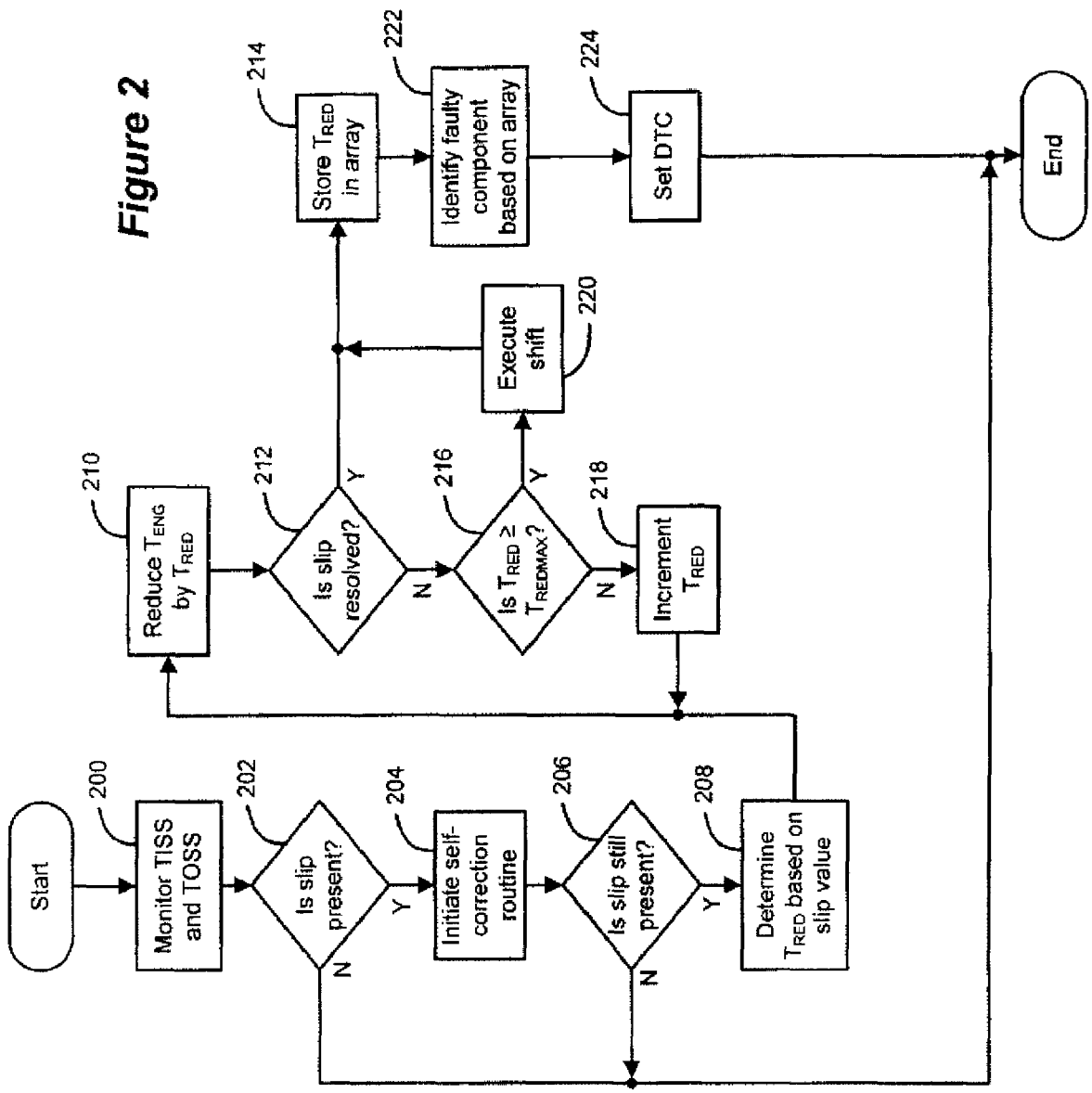
FIG. 2 is a flowchart illustrating exemplary steps executed by the transmission slip control of the present invention.

Referring now to FIG. 2, exemplary steps that are executed by the transmission slip control of the present invention will be described in detail. In step 200, control monitors TISS and TOSS. In step 202, control determines whether transmission slip for the particular gear ratio is present. If transmission slip is not present, control ends. If transmission slip is present, control initiates the self-correction routine in step 204. In step 206, control determines whether transmission slip is still present. If transmission slip is not still present, control ends. If transmission slip is still present, control continues in step 208.

Control determines $T_{RED}$ based on the slip value in step 208. In step 210, control reduces $T_{ENG}$ by $T_{RED}$. In step 212, control determines whether the slip condition is resolved. If the slip condition is resolved, control stores $T_{RED}$ in the array in step 214. If the slip condition is not resolved, control determines whether $T_{RED}$ is greater than or equal to $T_{REDMAX}$ in step 216. If $T_{RED}$ is not greater than or equal to $T_{REDMAX}$, control increments TRED in step 218 and loops back to step 210. If $T_{RED}$ is greater than or equal to $T_{REDMAX}$, control executes a transmission shift in step 220. In step 222, control identifies a faulty transmission components (e.g., transmission element and/or associated hydraulic circuit) based on the array values. Control sets a corresponding DTC in step 224 and control ends.

Figure 3:
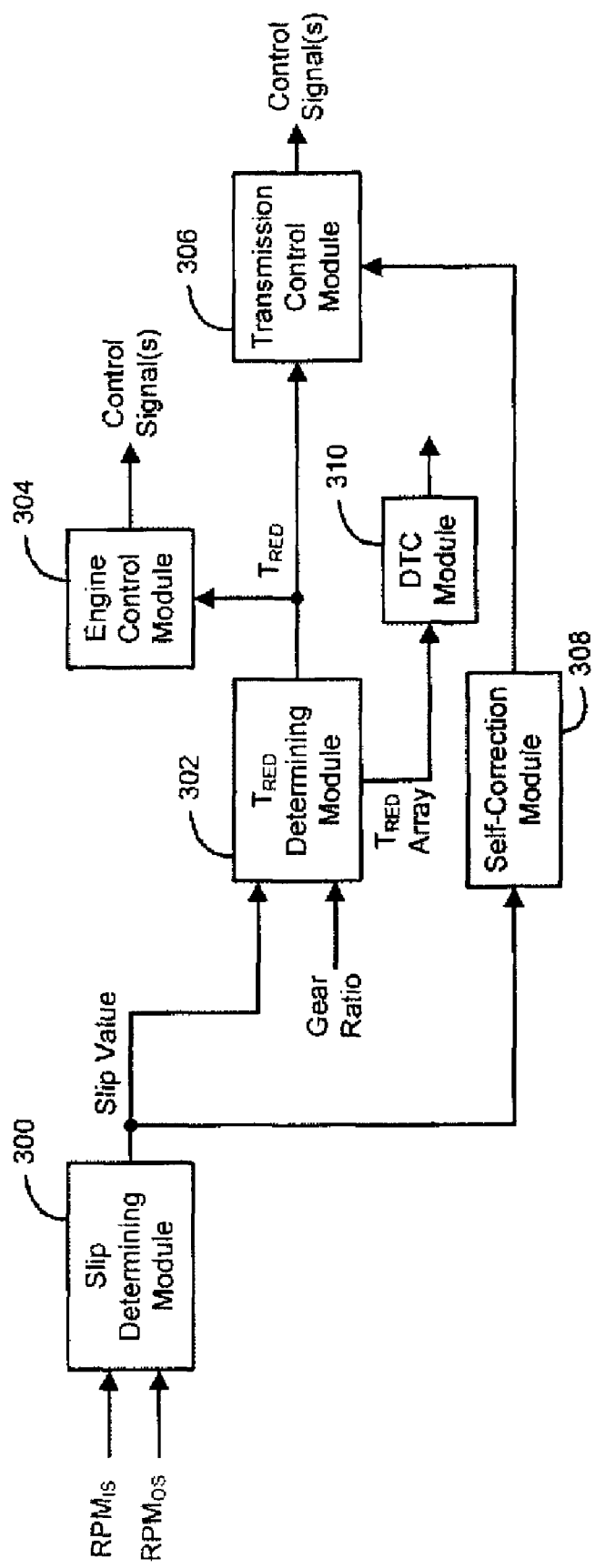
FIG. 3 is a functional block diagram of exemplary modules that execute the transmission slip control of the present invention.

Referring now to FIG. 3, exemplary modules that execute the transmission slip control will be described in detail. The exemplary modules include a slip determining module 300, a $T_{RED}$ determining module 302, an engine control module 304, a transmission control module 306, a self-correction module 308 and a DTC module 310. The slip determining module 300 generates a slip value based on the TISS and TOSS signals. The slip value is output to the $T_{RED}$ determining module 302 and the self-correction module 308. The $T_{RED}$ determining module 302 determines $T_{RED}$ based on the slip value and the current gear ratio. The self-correction module 308 selectively generates a self-correction routine signal that is output to the transmission control module 306.

The engine control module 304 regulates operation of the engine (e.g., $T_{ENG}$) based on $T_{RED}$. Similarly, the transmission control module 306 regulates operation of the transmission based on $T_{RED}$. The DTC module 310 selectively generates a DTC or DTCs based on the array, which is output from the $T_{RED}$ determining module 302.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of managing slip in a transmission that is driven by a prime mover, comprising:
   determining whether a slip condition of said transmission is present based on a slip value;
   determining a torque reduction value based on said slip value;
   reducing a torque output of said prime mover based on said torque reduction value;
   determining whether said slip condition is resolved by said reducing said torque output of said prime mover based on said torque reduction value;
   when said slip condition is resolved, storing said torque reduction value in an array, wherein said array includes N torque reduction values, wherein N is an integer equal to a number of gear ratios of said transmission, and wherein said N torque reduction values correspond to said N gear ratios of said transmission, respectively;
   comparing each of said N torque reduction values to a predetermined threshold; and
   identifying a faulty component within said transmission based on said comparison, wherein said faulty component includes a component associated with two or more of said N torque reduction values that are greater than said predetermined threshold.

2. The method of claim 1 further comprising comparing said torque reduction value to a maximum torque reduction value if said slip condition is not resolved.

3. The method of claim 2 further comprising initiating a shift of said transmission if said torque reduction value is greater than or equal to said maximum torque reduction value.

4. The method of claim 1 further comprising initiating a self-correction routine if said slip condition is present.

5. The method of claim 1 wherein said slip value is determined based on a transmission input shaft speed and a transmission output shaft speed.

6. The method of claim 1 further comprising setting a diagnostic trouble code based on said array.

7. The method of claim 1, wherein said predetermined threshold is approximately zero.

8. The method of claim 1, wherein said faulty component of said transmission is a clutch of said transmission.

9. The method of claim 2, further comprising incrementing said torque reduction value when said torque reduction value is less than said maximum torque reduction value.

10. The method of claim 9, further comprising repeating said reducing said torque output of said prime mover based on said incremented torque reduction value and repeating said determining whether said slip condition is resolved.

11. The method of claim 3, further comprising storing said torque reduction value in said array.

12. A method of managing slip in a transmission that is driven by a prime mover, comprising:
   determining whether a slip condition of said transmission is present based on a slip value;
   determining a torque reduction value based on said slip value;
   reducing a torque output of said prime mover based on said torque reduction value;
   determining whether said slip condition is resolved by said reducing said torque output of said prime mover based on said torque reduction value;
   when said slip condition is resolved, storing said torque reduction value in an array, wherein said array includes N torque reduction values, wherein N is an integer equal to a number of gear ratios of said transmission, and wherein said N torque reduction values correspond to said N gear ratios of said transmission, respectively;
   comparing each of said N torque reduction values to a predetermined threshold;
   identifying a faulty component within said transmission based on said comparison, wherein said faulty component includes a component associated with two or more of said N torque reduction values that are greater than said predetermined threshold; and maintaining normal operation of said transmission during operation under a reduced torque output condition, wherein a transmission shift is executed based on a vehicle speed and other operating parameters.

13. The method of claim 12 further comprising comparing said torque reduction value to a maximum torque reduction value if said slip condition is not resolved.

14. The method of claim 13 further comprising initiating a shift of said transmission if said torque reduction value exceeds said maximum torque reduction value.

15. The method of claim 12 further comprising initiating a self-correction routine if said slip condition is present.

16. The method of claim 12 wherein said slip value is determined based on a transmission input shaft speed and a transmission output shaft speed.

17. The method of claim 12 further comprising setting a diagnostic trouble code based on said array.

18. The method of claim 12, wherein said predetermined threshold is approximately zero.

19. The method of claim 12, wherein said faulty component of said transmission is a clutch of said transmission.

20. The method of claim 13, further comprising incrementing said torque reduction value when said torque reduction value is less than said maximum torque reduction value.

21. The method of claim 20, further comprising repeating said reducing said torque output of said prime mover based on said incremented torque reduction value and repeating said determining whether said slip condition is resolved.

22. The method of claim 14, further comprising storing said torque reduction value in said array.

* * * * *